United States Patent [19]

Sebastian et al.

[11] Patent Number: 5,410,229
[45] Date of Patent: Apr. 25, 1995

[54] MOTOR SPEED CONTROL CIRCUIT WITH ELECTRONIC CLUTCH

[75] Inventors: Tomy Sebastian, Saginaw, Mich.; Frank F. Athari, Baltimore, Md.

[73] Assignee: Black & Decker Inc., Newark, Del.

[21] Appl. No.: 203,504

[22] Filed: Feb. 28, 1994

Related U.S. Application Data

[63] Continuation of Ser. No. 923,243, Jul. 31, 1992, abandoned.

[51] Int. Cl.$^6$ ............................................ H02P 3/08
[52] U.S. Cl. .................................... 318/434; 388/903; 388/930; 361/31
[58] Field of Search ............... 318/434, 439, 254, 138, 318/432; 388/804, 806, 811, 815, 821, 823, 903, 937, 930; 361/23, 29, 31, 78, 87, 93–98; 307/570, 571, 580, 239, 468; 323/282, 284, 292, 311

[56] References Cited

U.S. PATENT DOCUMENTS

| | | | |
|---|---|---|---|
| 3,241,023 | 3/1966 | Eby . | |
| 3,477,007 | 11/1969 | Ducommun et al. | 318/434 |
| 3,624,475 | 11/1971 | Smith . | |
| 3,743,911 | 7/1973 | Erler . | |
| 3,855,511 | 12/1974 | Smith . | |
| 3,855,520 | 12/1974 | Stich . | |
| 3,868,554 | 2/1975 | Konrad . | |
| 3,892,146 | 7/1975 | Yasoshima | 81/52 |
| 3,912,994 | 10/1975 | Stovall . | |
| 3,914,671 | 10/1975 | Morton et al. . | |
| 4,012,681 | 3/1977 | Finger et al. . | |
| 4,037,145 | 7/1977 | Bailey et al. . | |
| 4,066,942 | 1/1978 | Bardwell et al. | 318/434 |
| 4,129,810 | 12/1978 | Harshberger, Jr. . | |
| 4,182,979 | 1/1980 | Douglas et al. | 318/434 |
| 4,200,832 | 4/1980 | Johannsson et al. . | |
| 4,210,855 | 7/1980 | Harer et al. . | |
| 4,211,961 | 7/1980 | Marumoto et al. . | |
| 4,237,408 | 12/1980 | Frecka | 318/39 X |
| 4,260,938 | 4/1981 | Joyes . | |
| 4,325,010 | 4/1982 | Lowndes . | |
| 4,327,391 | 4/1982 | Grzebielski . | |
| 4,381,479 | 4/1983 | Wesling et al. . | |
| 4,458,183 | 7/1984 | Neilson . | |
| 4,471,276 | 9/1984 | Cudlitz . | |
| 4,528,486 | 7/1985 | Flaig et al. | 318/439 X |
| 4,532,567 | 7/1985 | Kade . | |
| 4,581,711 | 4/1986 | Hirata et al. . | |
| 4,607,196 | 8/1986 | Abrahams et al. . | |
| 4,611,154 | 9/1986 | Lambropoulos et al. . | |
| 4,659,976 | 4/1987 | Johanson | 318/432 X |
| 4,677,356 | 6/1987 | Tsuneda et al. . | |
| 4,772,805 | 9/1988 | Kawata . | |
| 4,780,653 | 10/1988 | Bezos et al. . | |
| 4,792,735 | 12/1988 | Kim | 388/930 |
| 4,851,743 | 7/1989 | Schmerda et al. . | |
| 4,893,067 | 1/1990 | Bhagwat et al. | 388/817 |
| 4,945,445 | 7/1990 | Schmerda et al. | 361/94 X |
| 4,949,393 | 8/1990 | Ohmori et al. . | |
| 5,003,628 | 3/1991 | Houser et al. . | |
| 5,077,824 | 12/1991 | Nagata et al. | 388/937 X |
| 5,081,379 | 1/1992 | Korteling | 307/570 X |
| 5,099,138 | 3/1992 | Fukunaga | 307/571 X |
| 5,105,130 | 4/1992 | Barker et al. | 388/809 X |
| 5,126,603 | 6/1992 | Hattori | 307/571 |
| 5,237,262 | 8/1993 | Ashley et al. | 323/284 |

FOREIGN PATENT DOCUMENTS

| | | |
|---|---|---|
| 0049947 | 11/1985 | European Pat. Off. . |
| 0081684 | 9/1987 | European Pat. Off. . |
| 0419303 | 3/1991 | European Pat. Off. . |
| 3314823 | 10/1984 | Germany . |

OTHER PUBLICATIONS

International Rectifier, *HEXFET Power MOSFET designer's Manual*, "Power MOSFET Applications And Product Data", 1987, Fourth Edition, pp. E-43-E44 and I-150-I-161.

*Primary Examiner*—Jonathan Wysocki
*Attorney, Agent, or Firm*—Harness, Dickey & Pierce

[57] ABSTRACT

The pulse width modulated DC motor speed control circuit indirectly senses motor current using sense MOSFETs and a peak detector circuit with storage capacitor for deriving an average motor current signal. The average motor current signal is used both in the feedback loop of the pulse width modulated speed control circuit and also in the motor shutoff or clutch circuit. The clutch circuit shuts off power to the motor when a user-settable torque is reached. The motor speed control circuit is therefore adapted for use in hand-held DC power tools such as screwdrivers and nutdrivers which stop rotation at a predefined torque.

20 Claims, 3 Drawing Sheets

MOTOR SPEED CONTROL CIRCUIT WITH ELECTRONIC CLUTCH

This is a continuation of U.S. patent application Ser. No. 07/923,243, filed Jul. 31, 1992, now abandoned.

BACKGROUND AND SUMMARY OF THE INVENTION

The present invention relates generally to motor control circuits. More particularly, the invention relates to a pulse width modulated DC motor speed control circuit with electronic clutch operable at a user-settable torque.

In power tool applications such as electric screwdrivers and nutdrivers it is desirable to provide a clutch mechanism by which the rotation of the tool is arrested once a predetermined torque is achieved. Ideally, this shutoff torque is user-settable, to allow the user to preselect how tightly the screw or nut should be driven. Conventionally, mechanical clutch mechanisms have been provided for this purpose. However, mechanical clutch mechanisms add considerably to the cost and weight of the tool. For this reason alternative means for electronically controlling the maximum torque output of a power tool have been proposed.

In particular, it is known that the torque output of a motor is directly related to the current drawn by the motor. Consequently, it has been proposed to control the torque output of a power tool by monitoring the current through the motor and interrupting the supply of power to the motor when the current reaches a preselected level. This approach to providing an electronic clutch function typically involves the application of a sensing resistor that is connected in series with the motor to sense the current flow through the motor. The signal provided by the sensing resistor is therefore proportional to motor current. However, because the current sensing resistor must carry the same level of current as the motor, a current sensing resistor typically comprises a low resistance, high wattage resistor which consequently consumes a substantial amount of power in the form of heat. For power tools operating off of AC power this is generally not a problem. However, with a cordless power tool operating off of a portable power source, the presence of such a current sensing resistor in the control circuit serves to reduce the useful operating time of the power tool between charges.

Consequently, it is desirable to provide a motor speed control circuit, and in particular one adapted for controlling a DC motor, that includes an electronic clutch function which minimizes the power dissipation associated with the sensing of motor current.

In addition, it is desirable to also use the sensed current signal to provide closed loop speed control of the motor as well.

The present invention accomplishes these objectives by providing a method and apparatus for controlling a motor to deliver a selected speed as well as a selected maximum torque. According to one aspect of the invention the method includes supplying drive current to the motor through a first port of an electronically controlled switching circuit and supplying sense current through a second port of the electronically controlled switching circuit. In the presently preferred form the switching circuit employs sense MOSFETs. A speed control signal is supplied to a control port of the switching circuit to cause the switching circuit to selectively change state, thereby controlling the speed of the motor. According to the method of the invention, a user-settable reference value is provided to indicate the desired shutoff torque. A peak value is derived from the controlled sense current and this value is compared with the user-settable reference value indicative of the desired shutoff torque. Based on the comparison, the motor is placed in an OFF state when the user-settable torque has been attained. According to another aspect of the invention, the motor is latched in the OFF state once the user-settable torque has been attained.

The apparatus of the invention comprises a motor control circuit for supplying energy from a power source to the motor in order to deliver a user-selected speed and a user-selected maximum torque. The control circuit comprises a switching means coupled to the power source which has a first port coupled to the motor for supplying drive current to the motor, a second port for supplying a sense signal proportional to the drive current and a third port or control port for causing the switching means to selectively change state, thereby controlling the speed of the motor. The circuit further includes a modulator means which is coupled to the control port for supplying a speed control signal to the control port for causing the switching means to change state. A user-settable means is provided to supply a torque signal indicative of the user-selected torque. The control circuit also includes a torque control comparator means coupled to the user-settable means and to the switching means for comparing the torque signal and the sense signal. The torque control comparator means also places the motor in an OFF state when the user selected torque has been attained.

For a more complete understanding of the invention, its objects and advantages, reference is made to the following specification and to the accompanying drawings.

DESCRIPTION OF THE PREFERRED EMBODIMENT

Figure 1:
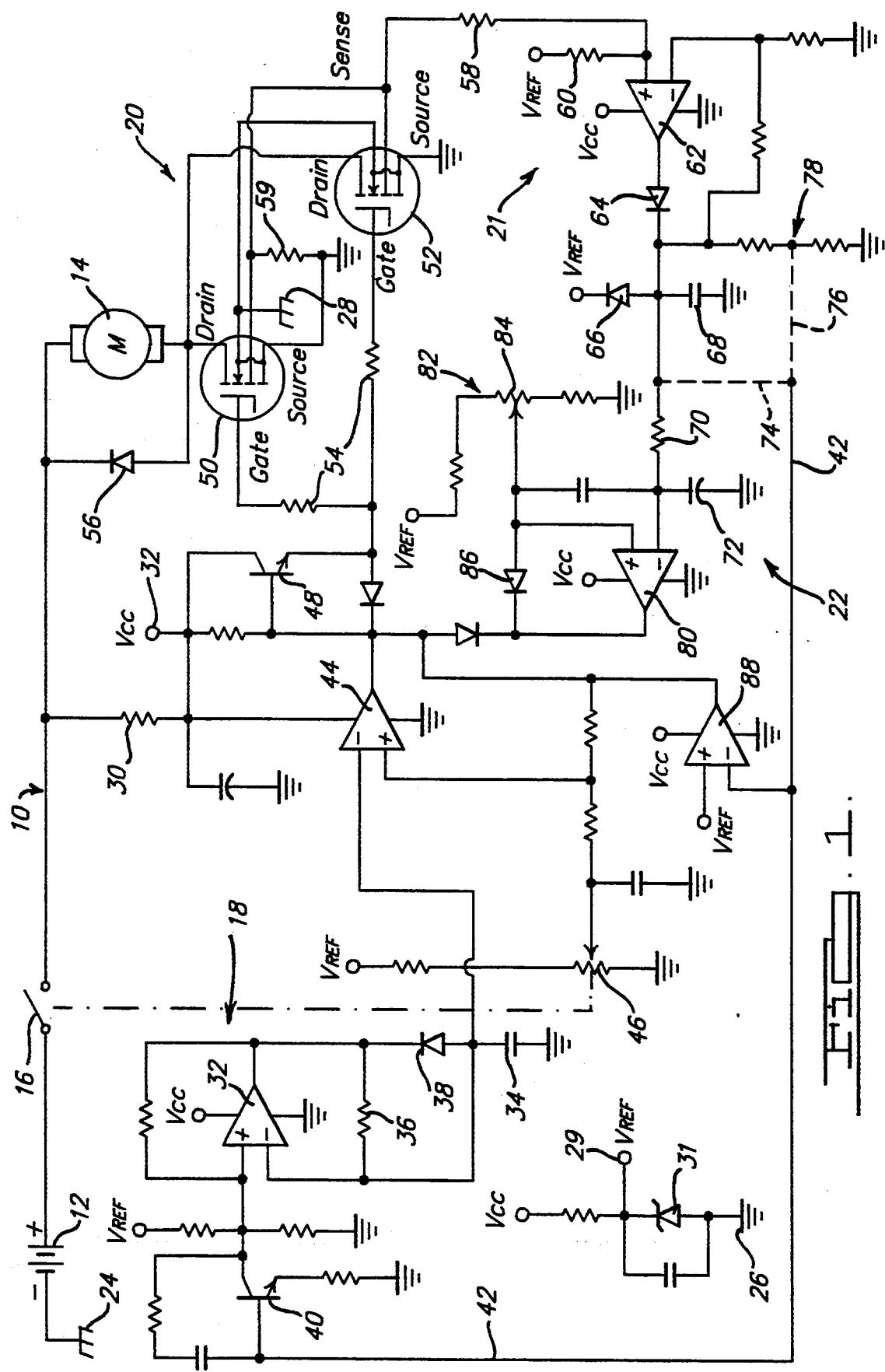
FIG. 1 is a schematic diagram of the presently preferred speed control circuit with electronic clutch.

Referring to FIG. 1, the presently preferred motor control circuit is illustrated generally at 10. The motor control circuit has been particularly adapted for use with portable DC power supplies, e.g. replaceable batteries or rechargeable batteries, although the invention is equally applicable to the control of AC motors as well. Thus in FIG. 1, the DC power source is illustrated as battery 12. Also illustrated is motor 14, which may be a permanent magnet DC motor. As illustrated, a switch 16 connects the positive side of power source 12 with motor 14. Switch 16 may be a manually operable trigger switch, for example.

The control circuit of FIG. 1 incorporates several functional subsystems, including a pulse width modulator subsystem 18, a current switching subsystem 20, a current sensing subsystem 21 and a torque control subsystem 22. As will be more fully explained below, the pulse width modulator subsystem provides a variable duty cycle pulse width modulated signal to control the current switching subsystem. The current switching subsystem, in turn, controls the supply of current through the motor. The torque control subsystem also controls the supply of current through the motor, by shutting off or inhibiting the supply of current when a user-defined torque has been reached.

The control circuit 10 has several voltage reference points or nodes which are shared or connected in common at various points throughout the circuit. It will aid the reader in understanding the circuit of FIG. 1 if a brief overview of these common nodes is given. Referring to the DC power source or battery 12, note that the negative terminal is connected to system ground or power ground 24. System ground 24 is also found in the schematic diagram near motor 14 as at 28. System ground is to be distinguished from control circuit ground, as at 26. Different ground symbols have been used to distinguish system ground from circuit ground. As will be more fully explained, when the current switching subsystem 20 is switched ON, motor current flows from the power source, through the motor and then through system ground. Thus system ground carries the heavy motor current. In contrast, circuit ground carries only the much smaller current used to power the electronic subsystems.

Another common reference node is the circuit supply node $V_{cc}$. This node is derived from the positive battery voltage, which can be seen by tracing the positive battery terminal through switch 16 and through conditioning resistor 30 to node 32. Node 32 is at the circuit reference potential $V_{cc}$. The $V_{cc}$ potential is found at a plurality of points throughout the circuit and is used to power the electronic subsystems. Although shown schematically at numerous separate points throughout the circuit, in an actual embodiment, these points would all be connected in common. The same is true of the circuit ground 26, appearing at several points throughout the circuit. These points would be connected in common in a physical embodiment.

To summarize, the electronic components comprising the subsystems used in the control circuit are powered by a connection between the $V_{cc}$ and system ground nodes or rails. The DC motor 14, which consumes an appreciably higher current than the electronic control components, is connected between the positive battery terminal and the system ground 24 (negative battery terminal).

In addition to the power supply voltages described above, the motor control circuit also uses a reference voltage $V_{ref}$, which appears several places in the schematic diagram, such as at 29. As illustrated, the reference voltage $V_{ref}$ is derived from the supply voltage $V_{cc}$ using a Zener diode 31. This reference voltage $V_{ref}$ is used at a number of nodes throughout the circuit where a fixed, known reference voltage is required for signal comparison purposes.

The pulse width modulator subsystem 18 produces a variable duty cycle signal used to control motor speed. The pulse width modulator circuit includes an operational amplifier configured as a ramp generator 32. The ramp generator produces a ramp or sawtooth waveform shown at line A in FIGS. 2a–2c. The waveform is produced by selectively charging capacitor 34 through resistor 36, and then discharging capacitor 34 through diode 38. The presently preferred embodiment uses a ramp waveform of about 15 kilohertz. The amplitude of the ramp waveform is adjusted by increasing and decreasing the current flow through transistor 40. The amplitude is higher in FIG. 2b than in FIG. 2a and is lower in FIG. 2c than in FIG. 2a. Current flow through transistor 40 is adjusted by a feedback signal applied to the transistor's base. The base of transistor 40 is coupled through feedback path 42 to the torque control subsystem to receive a signal indicative of actual motor speed. The torque control subsystem and the feedback signal indicative of actual motor speed will be discussed more fully below.

The output of ramp generator 32 is applied to the inverting input of comparator 44. A voltage divided desired speed reference signal is applied to the noninverting input of comparator 44. This signal is derived from speed control potentiometer 46, which is set by the user to select the desired motor speed when operating the tool. As illustrated, potentiometer 46 may be mechanically connected (indicated by the dotted lines) to the switch 16.

Figure 2A:
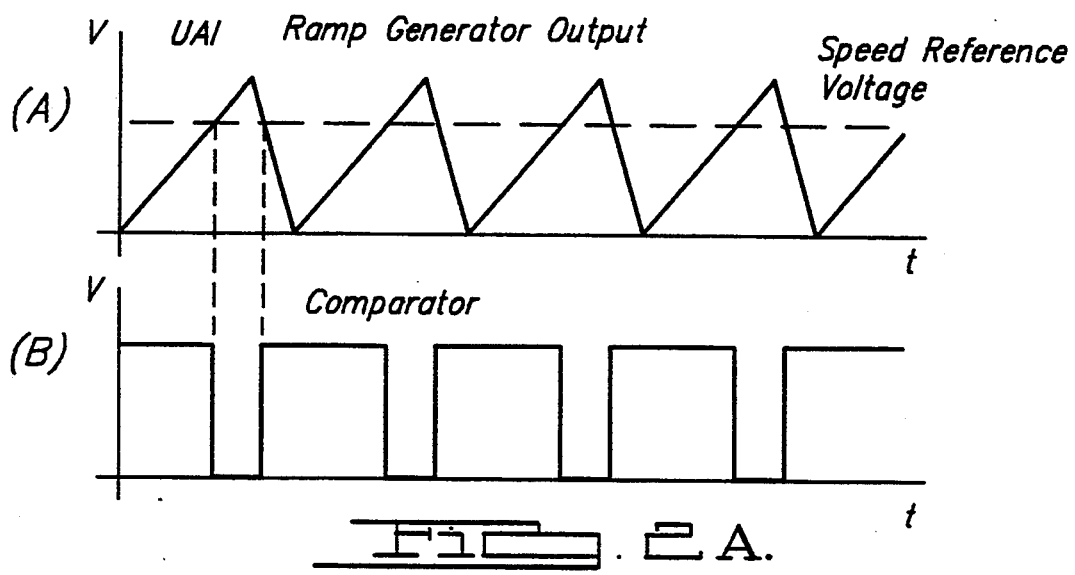
FIGS. 2a–2c are waveform diagrams illustrating exemplary signals produced by the ramp generator and comparator circuits which make up the pulse width modulator.
Figure 2B:
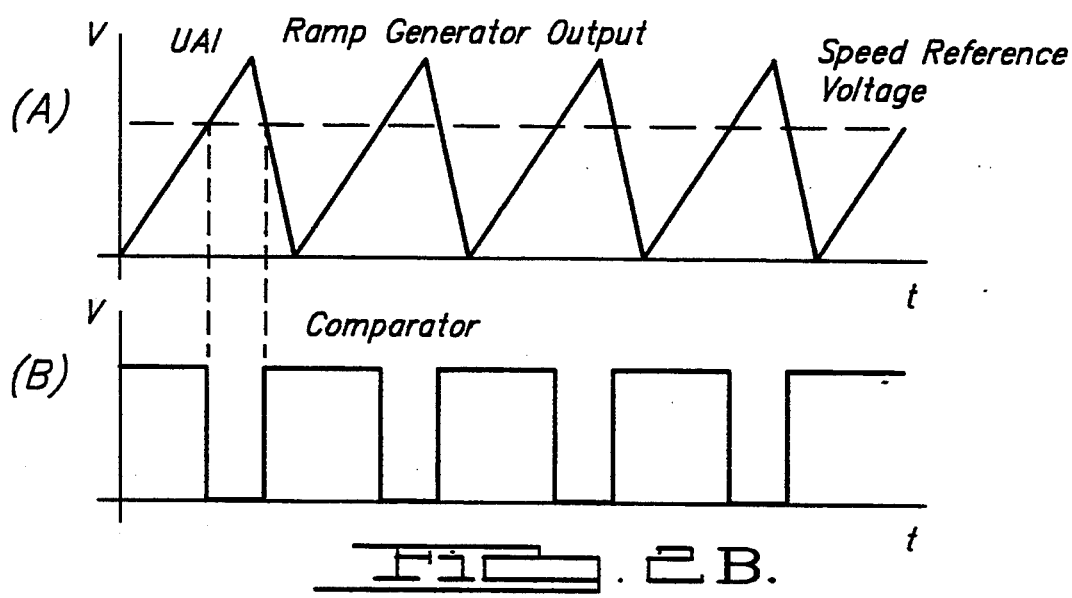
Figure 2C:
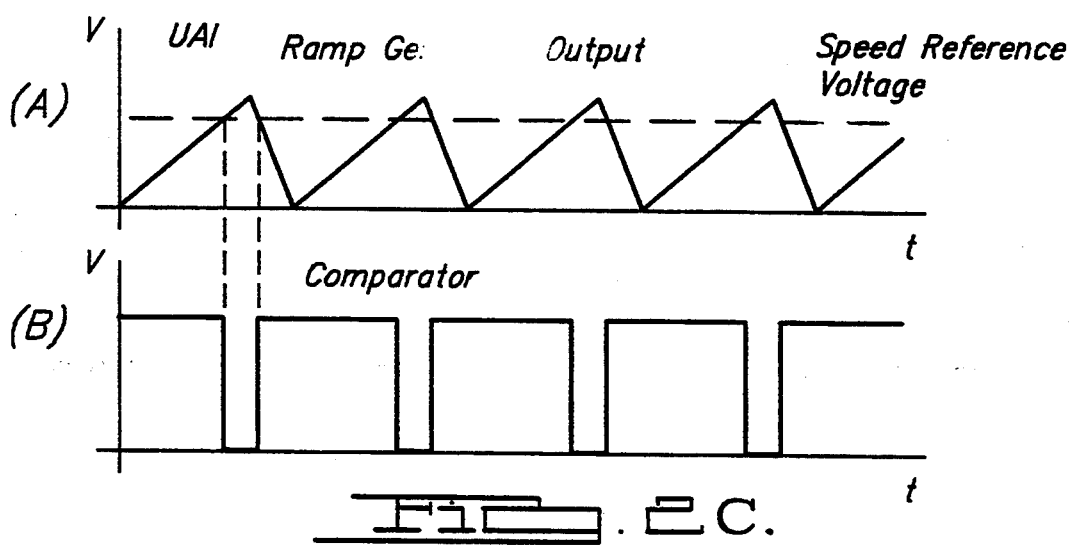

The output of comparator 44 changes state based on the comparison of the speed reference voltage with the instantaneous voltage of the ramp generator output waveform. This is depicted in FIGS. 2a–2c, where the output of comparator 44 is shown on line B. The user-selected speed reference voltage is shown as a constant DC level superimposed on the ramp generator waveform on line A. As shown, the output of comparator 44 is high when the instantaneous ramp generator voltage is less than the speed reference voltage. The output of comparator 44 is low when the instantaneous ramp generator voltage exceeds the speed reference voltage. Thus the output of comparator 44 is a periodic signal of frequency equal to or related to the frequency of the ramp generator output. If the user changes the setting on potentiometer 46 to select a different DC speed reference voltage level, then the ramp waveform will be intersected at a different position, resulting in a change in the duty cycle of the comparator output. Thus the output of comparator 44 is a variable duty cycle signal controlled by the feedback signal on feedback path 42 (which establishes the peak amplitude of the ramp) and by the user-selected speed reference voltage (which establishes the voltage level at which the comparator changes state. Specifically, the output of comparator 44 is at a high impedance or open circuit state when switched OFF and at circuit ground state when switched ON.

The output of the pulse width modulator subsystem 18, the variable duty cycle signal indicative of motor speed, is applied to transistor 48. Transistor 48, along with MOSFETs 50 and 52, make up the current switching subsystem 20. MOSFETs 50 and 52 are connected in parallel with the respective drain leads connected to the motor 14 and the respective source leads connected to the system ground 28. The gate leads of MOSFETs 50 and 52 are connected through resistors 54 to the emitter of transistor 48. The MOSFETs are power transistors capable of handling the motor current. When the MOSFETs are conductive the motor current flows from battery 12 through the motor, through the MOSFETs 50 and 52 and then to the system ground 28 for return to the negative battery terminal. Because motor 14 is an inductive device, the flow of current through the motor cannot switch instantaneously from ON to OFF. Accordingly, diode 56 is connected across the motor terminals, as illustrated, to provide a path for the flow of motor current when the MOSFETs 50 and 52 are switched OFF. MOSFETs 50 and 52 are connected in parallel to increase the current capacity of the circuit and to decrease the total power dissipation. In circuits requiring less current a single MOSFET could be used.

The flow of current through the motor varies with the torque delivered. Thus a measurement of the motor current could be used in a torque control circuit. However, motor current is quite substantial in a power tool (e.g., on the order of 20–40 amperes) and is difficult to sense without expensive, heavy-duty components. The flow of current through the MOSFETs is related to the motor current. The MOSFET current is also quite substantial, hence similarly difficult to sense without heavy-duty components. The current sensing subsystem 21 overcomes this problem by implementing an indirect sensing technique described below.

Figure 3:
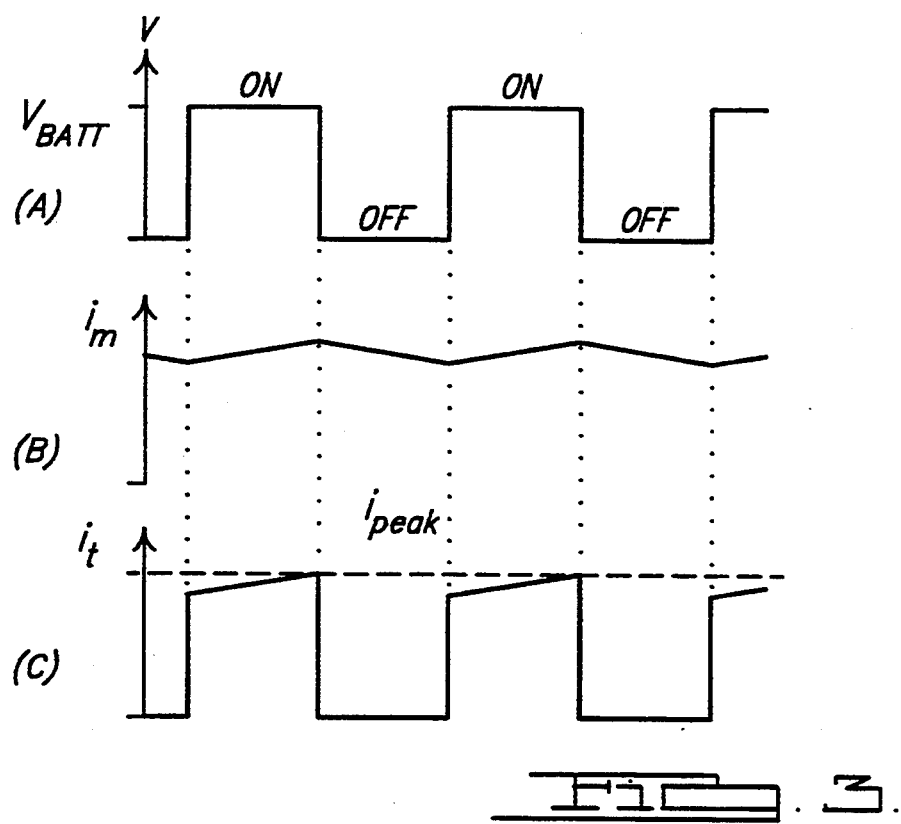
FIG. 3 is a waveform diagram illustrating exemplary voltage and current waveforms useful in understanding the operation of the invention.

FIG. 3 illustrates the relationship between motor current and MOSFET current. Although the MOSFETs and the motor are in series, the current flow through the motor is relatively continuous (it continues to flow through diode 56 when the MOSFETs are switched OFF), whereas the current flow through the MOSFETs is discontinuous or chopped. In FIG. 3, the voltage applied across the motor terminals is illustrated in line A. The motor current is illustrated in line B and the current flowing through MOSFETs 50 and 52 is illustrated in line C. For purposes of illustrating the invention, a 50% duty cycle waveform has been illustrated in this figure.

When the MOSFETs are conductive or ON, the voltage applied across motor 14 is essentially the battery voltage $V_{batt}$. When the MOSFETs are nonconductive or OFF, the voltage across the motor is essentially zero. As illustrated, the motor current (depicted on line B) is essentially a DC level with a slight ripple. This is the case because a comparatively high switching frequency (15 kilohertz) has been chosen. At high switching frequencies the motor current is not given adequate time to decay to zero during the OFF intervals. As noted above, the motor current will flow through diode 56 during the OFF intervals. The transistor current (depicted on line C) is a chopped or discontinuous waveform. During the ON interval the transistor current tracks the motor current. This is, of course, true because the MOSFETs 50 and 52 are in series with motor 14. During the OFF intervals, the transistor current is essentially zero.

As stated above, motor torque is a function of motor current and in a power tool the motor current can be quite substantial. The traditional method of measuring motor current is to place a low ohmic value resistor in series with the motor, so that a voltage drop can be measured across the resistor to calculate motor current. With large motor currents involved, the resistor must be a heavy-duty resistor such as a wire-wound resistor. The resistor handles a heavy current and dissipates a great deal of heat. Aside from being large and expensive, the use of a series resistor to measure motor current is further costly in portable power tool applications, since the heat dissipated by the resistor represents battery energy which is wasted.

The present invention avoids use of a heavy-duty series resistor and its attendant costs and shortcomings by employing a current sensing subsystem which indirectly senses the motor current. The indirect sensing thus avoids the need for a high wattage, power-wasting current sensing resistor.

An additional advantage of indirect sensing of motor current is that the sensed signal is referenced to ground. Thus it is not necessary to use an extra differential amplifier, which would otherwise be required if motor current were to be sensed from the motor circuit.

Figure 4:
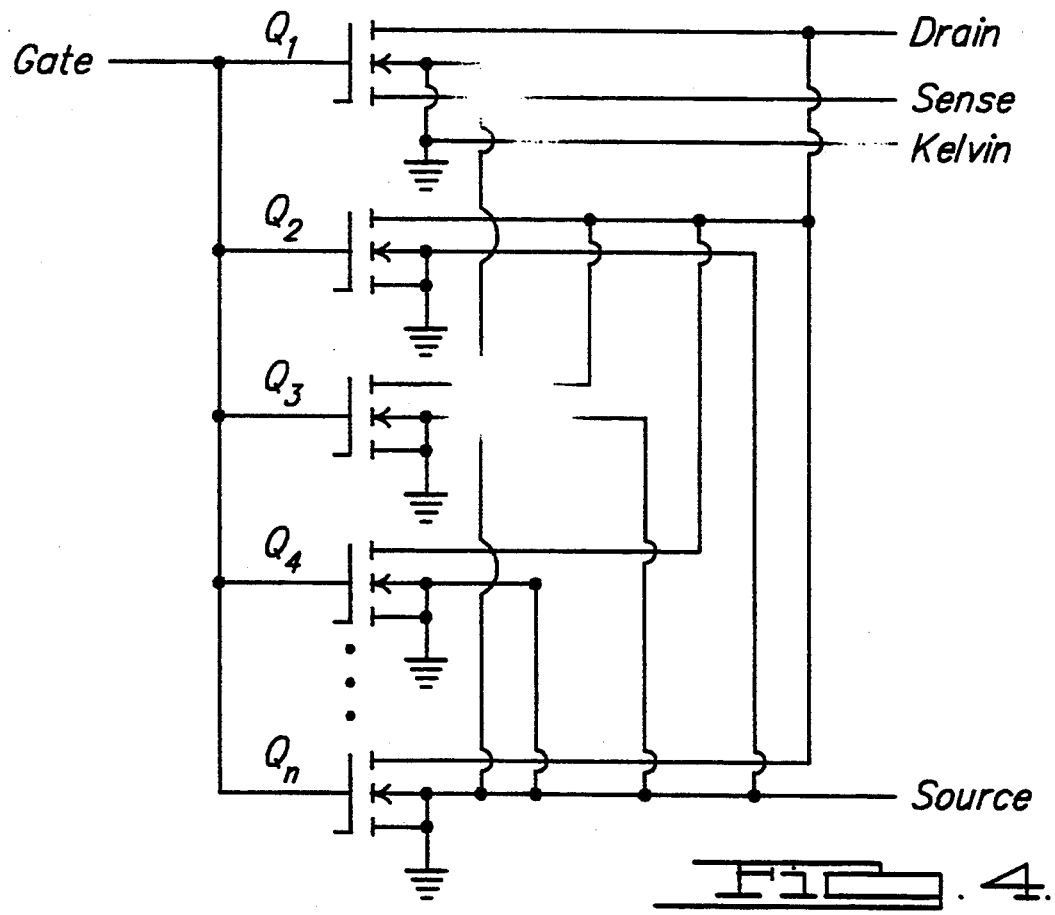
FIG. 4 is a schematic diagram illustrating the configuration of a sense MOSFET used in the presently preferred embodiment.

The current sensing subsystem 21 uses sense MOSFETs which have an additional "sense" terminal that supplies a current signal proportional to the current flowing through the source and drain terminals. FIG. 4 illustrates how the sense MOSFET is configured. Referred to FIG. 4, each sense MOSFET (e.g. MOSFETs 50 and 52) in actuality comprises a plurality of individual MOSFET devices in a single package. In FIG. 4 these individual MOSFET devices are labeled $Q_1-Q_4...Q_n$. The gate conductors of all transistors are connected in parallel and are connected to the external gate lead of the composite device. Similarly, the drain conductors of each transistor are connected in parallel and are connected to the external drain lead of the composite device. The source conductors of the individual transistors are connected in one of two ways. The source conductors of a majority of the individual transistors are connected in parallel to the substrate, which may be grounded, and also connected to the external source lead of the composite device. In FIG. 4 transistors $Q_2-Q_4$ and $Q_n$ are connected in this fashion. In contrast, the source conductors of a minority of the transistor devices are connected to a separate external sense lead. In FIG. 4 transistor $Q_1$ is connected in this fashion.

The composite MOSFET device is fabricated so that the number of individual devices connected to the external source terminal and the number of individual devices connected to the external sense terminal define a known proportion or ratio. By measuring the current flow through the sense terminal of the composite device, it is possible to calculate, using the known proportion, how much current is flowing through the drain terminal. For example, if there are 1000 times as many transistors connected to the source terminal as connected to the sense terminal, then a measured current of 10 milliamperes through the sense terminal would correspond to a flow of current of 10 amperes through the source terminal.

The MOSFETs 50 and 52, being connected in parallel, thus comprise an electronically controlled switching circuit. The drain leads of MOSFETs 50 and 52 comprise a first port coupled to the motor 14 for controlling drive current to the motor. The sense terminals of MOSFETs 50 and 52 comprise a second port connected to the resistor 59. This second port is used to supply a sense current. The gate terminals of MOSFETs 50 and 52 comprise a control port to which a pulse width modulated signal is applied via resistors 54. As described above, the electronically controlled switching circuit selectively changes state in response to the pulse width modulated signal in order to control the speed of the motor by switching the drive current ON and OFF at high frequency (nominally 15 kilohertz). Concurrently, the sense current is controlled in proportion to the drive current, being switched ON and OFF at the same high frequency.

The torque control subsystem uses the signal on the sense terminals of MOSFETs 50 and 52 as an indirect measurement of the current flowing through those transistors. Resistors 58 and 60, configured as a voltage divider, supply bias voltage to the operational amplifier 62. The current flowing through resistor 59 establishes a voltage drop which is sensed by the noninverting input of operational amplifier 62. Thus operational amplifier 62 senses a value which is proportional to the instantaneous current flowing through MOSFETs 50 and 52. Operational amplifier 62 is configured as a peak detector by means of diode 64 and capacitor 68. The output of the operational amplifier 62 (peak detector) is filtered by capacitor 72 and resistor 70 and stored in capacitor 72. The value stored in capacitor 72 is, in effect, a time averaged peak current value. In FIG. 3 this peak value is depicted as $i_{peak}$ in line C. This average peak current signal, determined by indirect sensing of the MOSFET current, is used by the system as a measure of the motor current. It should be understood, however, that the $i_{peak}$ current (FIG. 3) is not the actual motor current $i_m$ (FIG. 3), but merely a reliable indicator of it. As explained above, the present invention uses indirect sensing of actual motor current, thereby avoiding the need to use an expensive, heat dissipating, wirewound resistor in series with the motor as is the conventional practice.

The average motor current, indirectly sensed in this fashion, is used for two purposes. It is used as the feedback signal on feedback path 42, to provide an indication of actual motor speed. It is also used as an indication of motor current and thus motor torque, used by the torque control subsystem 22. The feedback signal for providing controlled motor speed will be described first.

The presently preferred embodiment uses a jumper (shown in dotted lines) by which the motor speed feedback signal is supplied to feedback path 42 via two alternate sensing points. The feedback path can be connected using jumper connection 74 to couple the feedback path directly to the output of the peak detector 62. In the alternative, jumper connection 76 may be used to connect the feedback path 42 to a resistive divider network 78. The resistive divider network provides a reduced amplitude signal which is otherwise the same as the peak detector signal supplied via jumper 74.

When the motor torque increases the peak current sensed by peak detector 62 also increases. This causes transistor 40 to increase conduction, thereby lowering the voltage applied to the noninverting input of ramp generator 32. Conversely, when the motor torque decreases the sensed peak current also decreases, causing transistor 40 to decrease conduction and raise the voltage applied to the noninverting input of ramp generator 32.

When the voltage applied to the base of transistor 40 is increased, the corresponding sawtooth waveform decreases in amplitude. Compare FIG. 2a with FIG. 2c. Conversely, when the voltage applied to the base of transistor 40 decreases the corresponding sawtooth waveform increases in amplitude. Compare FIG. 2a with FIG. 2b. An increase in the ramp waveform amplitude results in a reduction of the duty cycle of the comparator waveform in line B and a decrease in the amplitude of the ramp waveform causes an increase in the duty cycle of the comparator waveform. This is illustrated in FIGS. 2B and 2C, respectively.

The feedback signal on feedback path 42 functions as negative feedback for the speed control system, tending to maintain the speed constant at the user selected level. If, for example, the loading on the tool increases (which would tend to cause the tool to slow down), the motor current will increase, and the peak current sensed by detector 62 will increase, causing the ramp generator output to decrease in amplitude thereby increasing the duty cycle and causing the motor speed to increase enough to compensate for the additional load. Conversely, when the load is removed or decreased, the motor current will also decrease, causing the ramp amplitude to increase with a corresponding decrease in duty cycle of the pulse width modulator. This will prevent the motor speed from increasing once the load is removed.

The torque control subsystem employs a comparator 80 which is supplied at its inverting input with the peak current signal stored in capacitor 72. The noninverting input of comparator 80 is connected to the voltage divider network 82, which includes the torque selection potentiometer 84. The user is provided a manual control to set potentiometer 84 thereby providing the noninverting input of comparator 80 with a reference voltage indicative of the desired shutoff torque. The output of comparator 80, like that of comparator 44, is at a high impedance or open circuit state when switched OFF and at circuit ground state when switched ON. Thus when the capacitor 72 is charged to a level equal to the reference level supplied by voltage divider network 82, comparator 80 turns ON, pulling the base of transistor 48 to ground. When this occurs, transistor 48 switches OFF, causing the MOSFETs 50 and 52 to switch OFF as well. Once comparator 80 has switched ON, the current flow through diode 86 latches the comparator in the ON state. This ensures that the motor will remain switched OFF until the user resets the system by opening switch 16.

When diode 86 conducts, this creates a voltage drop on the noninverting input of the comparator 80. To insure that the comparator stays latched, bias is supplied to the inverting input (via operational amplifier 62 and resistors 58 and 60) in order to keep the inverting input above the noninverting input when the current is zero or when the MOSFETs 50 and 52 are off.

The torque control subsystem thus operates to shut off or inhibit the flow of current through motor 14 when a user-selected torque has been reached. This condition is determined by indirect sensing as described above. Because the output of peak detector 62 is filtered and stored in capacitor 72, the torque shutoff circuit does not respond to instantaneous changes in current, but rather in the integrated or average current value. Use of an integrated or average value makes the circuit responsive to the torque generated by the motor and not to instantaneous changes in transistor current. To provide protection for the MOSFETs, an optional instantaneous shutoff circuit may be provided.

Filtering of the sensed current signal is required to avoid shutoff of the circuit at starting and under sudden load changes. This is provided by resistor 70 and capacitor 72.

In the presently preferred embodiment a comparator 88 is connected as shown, with its noninverting input connected to the reference voltage $V_{ref}$ and its inverting input connected to the feedback path 42. By connection directly to the feedback path 42, comparator 88 is responsive to the instantaneous current sensed by peak detector 62. Like comparators 44 and 80, the comparator 88 is at a high impedance or open circuit state when OFF and at circuit ground 26 when ON. Operational amplifier 88 will thus indirectly sense the peak current flowing through MOSFETs 50 and 52 and will switch those transistors OFF by pulling the base of transistor 48 to ground when the peak current exceeds a predetermined level. This will prevent the MOSFETs 50 and 52 from being burned out.

From the foregoing, it will be understood that the motor control circuit of the invention incorporates an electronic clutch or motor shutoff circuit which activates when the motor torque reaches a user-selected level. This feature is incorporated into the pulse width modulated motor speed control circuit. The circuit, with torque control feature, is ideally suited for portable DC power tools which are intended to be operated from portable power supplies such as replaceable or rechargeable batteries. The circuit is quite efficient in that by using indirect sensing of motor current, it avoids the need for heavy-duty series resistors in the motor supply circuit. This aspect is quite important since it reduces cost and heat dissipation and adds significantly to battery run time.

While the invention has been illustrated and described in connection with the presently preferred embodiment, it will be understood that certain modifications can be made to the circuit without departing from the spirit of the invention as set forth in the appended claims.

What is claimed is:

1. A motor control circuit for supplying energy from a power source to a motor to deliver a user-selected torque, comprising:
   a solid-state switching device having ON and OFF states and having first and second semi-conductor terminals connected in series with said motor between said power source and ground for conducting drive current through said motor when said switching device is in said ON state, a third semi-conductor terminal for controlling the conductive state of said switching device, and a fourth semi-conductor terminal for producing a low current sense signal the magnitude of which is related to the current flowing across said first and second semi-conductor terminals and hence through said motor;
   modulator circuit means coupled to said third semi-conductor terminal and responsive to said sense signal for supplying a speed control signal to said third semiconductor terminal to control the conductive state of said switching device, said modulator circuit means varying a characteristic of said speed control signal in accordance with said sense signal;
   user-settable means for providing a torque signal indicative of a user-selected torque; and
   torque control comparator means coupled to said user-settable means and to said fourth semi-conductor terminal of said switching device for comparing said torque signal and said sense signal and for causing said modulator circuit means to place said switching device in its OFF state when said sense signal bears a predetermined relationship to said torque signal.

2. The circuit of claim 1 wherein said power source is a portable DC power source.

3. The circuit of claim 1 wherein said switching device comprises a MOSFET.

4. The circuit of claim 1 wherein said switching device comprises a plurality of parallel connected MOSFETs.

5. The circuit of claim 1 further comprising latching means for latching said switching device in said OFF state once said user-selected torque has been attained.

6. The circuit of claim 1 further comprising means coupled to said third semi-conductor terminal for detecting and storing a peak signal indicative of the peak amplitude of said sense signal and wherein said torque control comparator means compares said torque signal with said peak signal.

7. The circuit of claim 1 wherein said sense signal is a current signal and is substantially less than said drive current.

8. The circuit of claim 1 further comprising diode means coupled across said motor for providing a path to support the flow of motor current regardless of the state of said switching device.

9. The circuit of claim 1 wherein said modulator means supplies a pulse width modulated signal.

10. The circuit of claim 1 wherein said switching device selectively changes state between a conductive and a nonconductive state.

11. The circuit of claim 1 wherein said switching device selectively changes state at a predetermined frequency.

12. The circuit of claim 1 wherein said speed control signal causes said switching device to change state at a predetermined frequency sufficient to maintain the flow of motor current at a generally constant level for a given motor speed.

13. The circuit of claim 12 wherein said predetermined frequency is about fifteen kilohertz (15 kHz).

14. The circuit of claim 1 further comprising a second user-settable means coupled to said modulator circuit means for providing a speed reference signal indicative of desired motor speed.

15. The circuit of claim 1 further comprising a second user-settable means coupled to said modulator circuit means for providing a speed reference signal indicative of desired motor speed and wherein said modulator circuit means comprises waveform generator means for producing a periodic generally sawtooth waveform and a comparing means receptive of said speed reference signal and said sawtooth waveform for generating said speed control signal based upon the comparison of said speed reference signal and the instantaneous amplitude of said sawtooth waveform.

16. A method of controlling a motor supplied with energy from a power source to deliver a controlled torque and controlled speed, comprising:
   producing a desired motor speed signal;
   producing a desired torque signal;
   supplying drive current to said motor through an electronically controlled switching circuit;
   sensing the amount of drive current supplied to said motor and deriving a motor current signal;
   developing a first control signal from said motor current signal having a characteristic related to the actual speed of the motor;
   developing a second control signal from said motor current signal having a characteristic related to the actual torque of the motor;
   comparing said first control signal to said desired motor speed signal and controlling said electronically controlled switching circuit in accordance with the difference between said signals to control the speed of the motor; and
   comparing said second control signal to said desired torque signal and causing said electronically controlled switching circuit to interrupt the supply of drive current to the motor when said second control signal bears a predetermined relationship to said desired torque signal.

17. The method of claim 16 further comprising using said second control signal to shut off drive current through said switching circuit to said motor in the event a predetermined overload condition occurs.

18. The method of claim 16 wherein said second control signal is developed in accordance with the peak value of the motor current signal.

19. The method of claim 16 wherein said second control signal is developed in accordance with the average peak value of the motor current signal.

20. The method of claim 16 wherein said electronically controlled switching circuit provides a sense current terminal which issues a sense current signal of substantially lower amplitude than said drive current and wherein said second control signal is developed using said sense current signal.

* * * * *